United States Patent

Sietmann, Vernon H.

[15] 3,686,802

[45] Aug. 29, 1972

[54] AUXILIARY ROOF STRUCTURE FOR GRAIN DRYING BINS

[72] Inventor: Sietmann, Vernon H., Laurel, Iowa 50141

[22] Filed: Dec. 11, 1969

[21] Appl. No.: 884,186

[52] U.S. Cl. .......................... 52/15, 52/82, 52/95, 52/198, 52/199, 98/55
[51] Int. Cl. ........................... E04b 7/18, E04d 13/00
[58] Field of Search .............. 52/3, 5, 11, 22, 13–15, 52/198–199, 95; 248/48.1; 98/54–55

[56] References Cited

UNITED STATES PATENTS

| | | |
|---|---|---|
| 209,031 | 10/1878 | Farquhar .................... 52/95 |
| 922,329 | 5/1909 | Porter ........................ 52/199 |
| 1,229,040 | 6/1917 | Crawford ..................... 52/3 |
| 1,460,098 | 6/1923 | Houser ....................... 52/3 |
| 1,861,062 | 5/1932 | Nissen ....................... 52/22 |
| 2,726,608 | 12/1955 | Ashley ....................... 52/95 |
| 2,770,020 | 11/1956 | Zerbe ........................ 52/15 |
| 2,874,651 | 2/1959 | Peterson ..................... 52/3 |

FOREIGN PATENTS OR APPLICATIONS 893,575  9/1953  Germany ..................... 52/95

Primary Examiner—Frank L. Abbott
Assistant Examiner—Leslie A. Braun
Attorney—Zarley, McKee & Thomte

[57] ABSTRACT

An auxiliary roof structure for grain drying bins including an upstanding wall structure with a conical shaped roof structure supported thereon. The auxiliary roof structure is comprised of a plurality of roof panels connected together to form a frusto-conical shaped auxiliary roof portion positioned below the lower ends of the roof structure to catch any accumulated condensation which might fall from the inside surface of the lower length of the roof structure and to convey the same outwardly of the wall structure. Condensation collecting on the underside of the auxiliary roof portion will also be conveyed outwardly of the wall structure.

4 Claims, 4 Drawing Figures

PATENTED AUG 29 1972  3,686,802
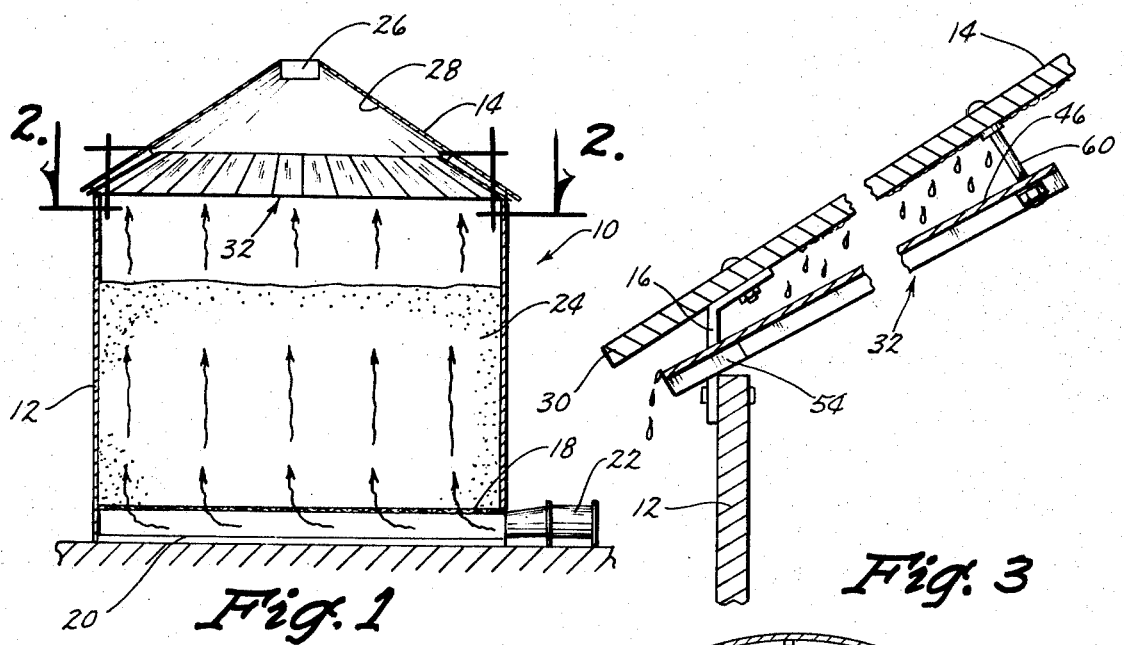
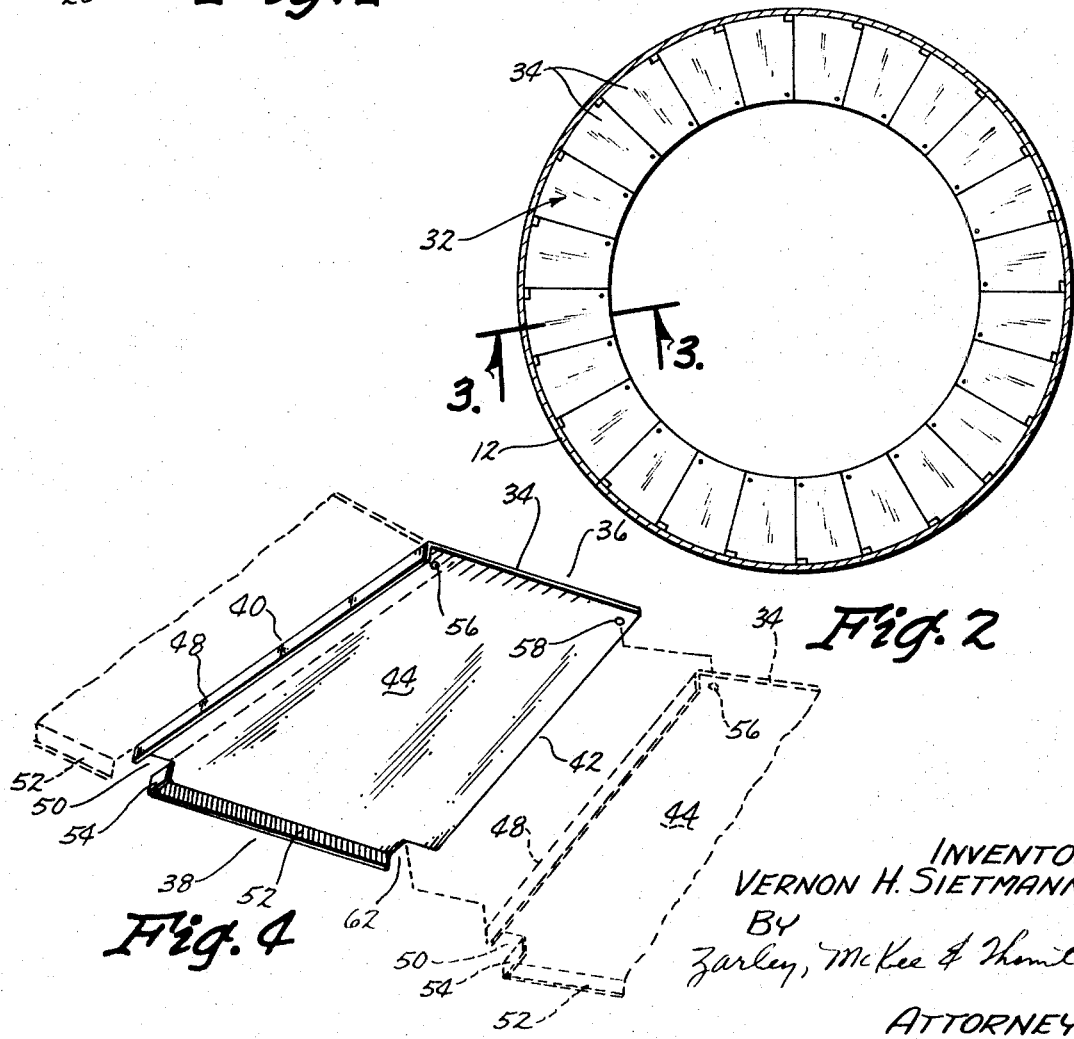
INVENTOR
VERNON H. SIETMANN
BY
Zarley, McKee & Thomte
ATTORNEYS

AUXILIARY ROOF STRUCTURE FOR GRAIN DRYING BINS

Conventional grain drying bins usually include a wall structure having a conical roof mounted thereon. The bins generally have one or more perforated false bottoms or other means therein for supporting the grain thereon. Heated air is forced upwardly through the grain to dry the same and the moisture laden air is discharged from the roof opening after it has passed through the grain. This drying process results in condensation accummulating on the underside of the bin roof. Initially, the surface tension of the condensation causes it to cling to the underside of the roof. The accumulated condensation or moisture soon begins to run downwardly towards the eaves and the moisture drips downwardly into the grain adjacent the wall of the bin since the surface tension is not sufficient to keep the moisture on the roof as it nears the bin wall. The moisture dripping downwardly into the grain is an extremely undesirable condition since it is practically impossible to dry the grain adjacent the wall structure.

Therefore, it is a principal object of this invention to provide a means for preventing moisture from dripping downwardly from the roof of the grain drying bin into the grain.

A further object of this invention is to provide an auxiliary roof structure for a grain drying bin.

A further object of this invention is to provide an auxiliary roof structure which is easily mounted in the interior of a grain drying bin.

A further object of this invention is to provide an auxiliary roof structure for a grain drying bin comprised of a plurality of auxiliary roof panels.

A further object of this invention is to provide an auxiliary roof structure for grain drying bins which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a sectional view of a grain drying bin having the auxiliary roof structure mounted therein;

FIG. 2 is an enlarged sectional view as seen along line 2—2 of FIG. 1;

FIG. 3 is an enlarged sectional view as seen along lines 3—3; and

FIG. 4 is a bottom perspective view of one of the auxiliary roof panels as seen from the inside of the bin.

The numeral 10 refers generally to a common type storage bin such as seen in FIG. 1 and including an upstanding wall portion 12 having a conical shaped roof 14 mounted thereon in conventional fashion by means of braces 16 (FIG. 3). Bin 10 includes a perforated false bottom 18 spaced above the bottom 20 of the bin. Heated air is passed into the bin 10 by means of conduit 22 and is forced upwardly through the perforated bottom 18 and through the grain as illustrated in FIG. 1. The heated air collects moisture from the grain 24 as it passes upwardly therethrough and is discharged through the access opening 26 of the bin. The moisture laden air is directed against the underside 28 of the roof 14 prior to its being discharged from the access opening 26. Condensation collects on the underside of the roof 14. Initially, the surface tension of the condensation is sufficient to cause the condensation to cling to the underside 28 of the roof 14. However, the condensation soon begins to run downwardly along the underside 28 of the roof 14 toward the eave 30. As the condensation or moisture runs downwardly along the underside 28 of the roof 14, the surface tension is no longer sufficient to maintain the moisture on the underside of the roof 14 as it nears the wall 12 and the condensation or moisture drips downwardly into the grain adjacent the wall 12. The grain adjacent the wall 12 soon becomes extremely wet and it is impossible to sufficiently dry the grain adjacent the wall 12 due to the high moisture content thereof and due to the fact that the moisture continues to drip downwardly into those areas as the heated air is passed upwardly through the grain. To eliminate the moisture problem just described, an auxiliary roof structure 32 is provided in the bin 10.

Auxiliary roof structure 32 is comprised of a plurality of auxiliary roof panels 34 secured together so as to extend around the lower end of the inside surface 28 of the roof 14. Inasmuch as each of the roof panels 34 are identical, only one of the panels will be described in detail. A panel 34 is seen in a bottom perspective view in FIG. 4. Panel 34 includes an upper end 36, lower end 38, sides 40 and 42, bottom surface 44 and top surface 46. Panel 34 is provided with a downwardly extending flange 48 at side 40 which is provided to give the panel sufficient strength. As seen in FIG. 4, panel 34 includes a cut-out portion 50 provided therein adapted to receive one of the braces 16 therein so that the panels 34 may be positioned with respect to the wall 12 as illustrated in FIG. 3 wherein the lower end of the panel 34 extends outwardly of the wall 12. Panel 34 is provided with a downwardly extending flange 52 at its lower end and a downwardly extending flange 54 which also extends downwardly from the panel 34. As seen in FIG. 4, the flange 54 is transverse to the flange 52 and is provided on the panel to engage the upper end of the wall 12 as illustrated in FIG. 3 to maintain the panel 34 above the upper end of the wall 12. Panel 34 includes a pair of openings 56 and 58 formed therein adjacent the upper corners thereof adapted to receive bolts 60 extending therethrough.

The panels 34 are mounted in the bin 10 below the underside 28 of roof 14 as illustrated in the drawings. The panels 34 are secured to each other by overlapping the sides thereof as illustrated in FIG. 4 and by extending a bolt 60 downwardly through the roof 14 and through an opening 58 in one panel 34 and through opening 56 in the overlapped adjacent panel 34. The lower ends of the panels 34 are supported on the upper end of the wall 12 by means of the flanges 54 engaging the same as illustrated in FIG. 3. The lower end of the panels 34 extend outwardly of the wall 12 due to the cut-out areas 50 receiving the braces 16.

The panels 34 are preferably constructed of a suitable metal material such as aluminum, galvanized steel, etc. Preferably, the length of the panels, that is, the distance between the upper and lower ends, is approximately one-third to one-fourth of the length of the roof 14. The moisture accummulating on the underside 28 of the roof 14 will run downwardly therealong and will drop downwardly onto the top surface 46 of the panels 34 and will be conveyed outwardly of the wall 12 as illustrated in FIG. 3. Since the panels 34 are of relatively short length, any moisture condensing on the bottom sides thereof will cling to the panels by surface tension throughout the relatively short travel distance to the outside of the bin.

As seen in FIG. 4, the panel 34 is also provided with a cut-out portion 62 formed in the lower end thereof at side 42. The cut-out portion 62 in one panel 34 is "mated" with the cut-out portion 50 of the overlapped panel 34 (FIG. 4) to permit the brace 16 to be received therein so that the lower end of the panel will be positioned outwardly of wall structure 12.

Thus it can be seen that a unique auxiliary roof structure has been provided for grain drying bins which prevents moisture from dripping downwardly from the bin roof into the grain which is being dried. The auxiliary roof structure is adaptable for any type of grain drying bins having an inclined roof structure. Thus it can be seen that the auxiliary roof structure of this invention accomplishes at least all of its stated objectives.

I claim:
1. In a storage structure,
a wall structure having an upper end,
an inclined roof portion having upper and lower ends, the lower end of said roof portion being secured to and extending downwardly over the upper end of said wall structure in a spaced relationship,
an auxiliary roof structure having upper and lower ends and being positioned below only the lower end of said roof portion to catch only accumulated condensation which might fall from the lower length of said roof portion,
said auxiliary roof structure having its lower end extending between said roof portion and the upper end of said wall structure, the lower end of said roof structure being positioned outwardly of said wall structure to permit moisture on either side of said roof portion and said roof structure to be conveyed outside of said wall structure,
said wall structure being circular and said roof portion being conical in shape, said auxiliary roof structure extending around the interior of said storage structure and being comprised of a plurality of panels secured together to form a frusto-conical shaped auxiliary roof structure,
each of said panels having upper and lower ends, top and bottom surfaces, and first and second sides, said lower ends of said panels being positioned outwardly of said wall structure,
said roof portion being secured to said wall structure by a plurality of spaced apart braces secured thereto and extending therebetween, each of said panels having first and second cut-out portions formed at their lower ends for receiving one of said braces to permit the lower end of said panel to extend outwardly of said wall structure.

2. The structure of claim 1 wherein each of said panels has an elongated strengthening flange extending downwardly from one of its said sides.

3. The structure of claim 2 wherein each of said panels has a supporting flange extending downwardly therefrom adapted to engage the upper end of said wall structure to space said bottom of said panel above said wall structure.

4. The structure of claim 3 wherein said panels are secured together overlapping the adjacent sides thereof, the upper ends of said panels being secured to said roof portion by a bolt means extending through the upper ends of the overlapped portions of said panels.

* * * * *